(12) United States Patent
Ramoth

(10) Patent No.: US 7,481,238 B2
(45) Date of Patent: Jan. 27, 2009

(54) AUTOMATIC DEGASSING VALVE

(76) Inventor: Roger Ramoth, 1384 Pomton Ave., Cedar Grove, NJ (US) 07009

( * ) Notice: Subject to any disclaimer, the term of this patent is extended or adjusted under 35 U.S.C. 154(b) by 131 days.

(21) Appl. No.: 11/501,234

(22) Filed: Aug. 9, 2006

(65) Prior Publication Data
US 2007/0034256 A1 Feb. 15, 2007

Related U.S. Application Data

(60) Provisional application No. 60/706,450, filed on Aug. 9, 2005.

(51) Int. Cl.
*F16K 24/04* (2006.01)
(52) U.S. Cl. .................. 137/202; 96/165; 137/434
(58) Field of Classification Search .............. 137/202, 137/15.26, 315.08, 434, 454.5, 429, 422; 96/158, 162, 165
See application file for complete search history.

(56) References Cited

U.S. PATENT DOCUMENTS

| | | | |
|---|---|---|---|
| 1,710,848 A | 4/1929 | Turek | |
| 1,868,522 A | 7/1932 | Crispin | |
| 2,633,142 A | 3/1953 | Woolley | |
| 2,998,057 A | 8/1961 | Graham | |
| 3,002,522 A | 10/1961 | Klinefelter | |
| 3,018,787 A | 1/1962 | Kirk, Jr. | |
| 3,149,640 A | 9/1964 | KlineFelter | |
| 3,306,314 A | 2/1967 | Judsen | |
| 3,340,887 A | 9/1967 | Peters | |
| 3,394,724 A | 7/1968 | Klinefelter | |
| 3,577,978 A * | 5/1971 | Garcea | 123/339.1 |
| 3,586,032 A | 6/1971 | Weinstein | |
| 3,599,659 A | 8/1971 | Nuter | |
| 4,387,733 A | 6/1983 | Balazs et al. | |
| 4,586,528 A | 5/1986 | Andres et al. | |
| 4,730,638 A | 3/1988 | Hazelton | |
| 4,856,550 A * | 8/1989 | Smelcer | 137/192 |
| 4,886,089 A | 12/1989 | Gabrlik et al. | |
| 5,123,938 A * | 6/1992 | Nobel | 96/165 |
| 5,313,977 A | 5/1994 | Bergsma et al. | |
| 5,386,844 A | 2/1995 | Kennedy | |
| 5,409,033 A * | 4/1995 | Hirayama | 137/202 |
| 5,450,924 A | 9/1995 | Tseng | |
| 5,613,513 A | 3/1997 | Makowan | |
| 5,685,331 A | 11/1997 | Westermeyer | |
| 5,988,201 A | 11/1999 | Lebkuchner et al. | |
| 6,012,434 A | 1/2000 | Hartke et al. | |
| 6,035,883 A | 3/2000 | Benjey | |
| 6,422,255 B1 | 7/2002 | Hartke et al. | |
| 6,431,199 B1 | 8/2002 | Kolb et al. | |
| 6,513,541 B1 | 2/2003 | Herlihy | |
| 6,592,367 B2 * | 7/2003 | Kyritsis | 433/8 |
| 6,659,120 B2 | 12/2003 | Kolb et al. | |

(Continued)

*Primary Examiner*—Gregory L Huson
*Assistant Examiner*—Craig M Schneider
(74) *Attorney, Agent, or Firm*—Millen, White, Zelano & Branigan, P.C.

(57) ABSTRACT

An automatic degassing valve has a chamber with a float positioned therein to provide for automatically venting gas from a fluid system. The degassing valve includes an actuator lever having on one end a closure for sealing a vent and being attached at the other end to the float. Upward and downward movement of the float causes the actuator lever to close and open the vent. The degassing valve is made of corrosion resistant material and is readily disassembled and assembled for modification and repair.

11 Claims, 7 Drawing Sheets

U.S. PATENT DOCUMENTS

| | | | |
|---|---|---|---|
| 6,669,043 B2 * | 12/2003 | Fish et al. | 220/4.14 |
| 6,834,771 B2 * | 12/2004 | Suzuki et al. | 220/361 |
| 6,848,463 B2 | 2/2005 | Johansen | |
| 7,188,639 B2 * | 3/2007 | Yada et al. | 137/340 |
| 7,224,575 B2 * | 5/2007 | Sherwood | 361/508 |
| 7,275,556 B2 * | 10/2007 | Frohwein | 137/15.17 |

* cited by examiner

AUTOMATIC DEGASSING VALVE

RELATED APPLICATIONS

This application claims priority to U.S. Provisional Application No. 60/706,450, filed Aug. 9, 2005; titled "Automatic Vent Valve" and incorporated herein in its entirety by reference.

FIELD OF THE INVENTION

This invention relates generally to automatic degassing valves, and more particularly to such valves which vent gases from liquid processing lines or systems.

BACKGROUND OF THE INVENTION

Entrained gases of any kind in liquid processing systems can cause system problems such as pressure surges, overworked pumps, water hammer, deadhead, siphoning and pump failure. According, processor vent gases are vented from liquid processing systems through degassing valves which are disposed in fluid lines. When the liquids or gases being processed or produced are corrosive, such as for example, sodium hyperchlorate, hydrochloric acid or ozone, degassing valves are subject to more repaid degredation and failure which can lead to the aforementioned system problems. Moreover, it is desirable to have degassing valves which are readily repairable on site or are readily replaceable in order to avoid costly processing delays.

While the aforementioned problems occur primarily in system lines, tanks enclosing corrosive liquids are faced with similar problems and is desirable to provide degassings for enclosures, which vents resist corrosion are easy to repair.

Current degassing valves provided for these purposes do not adequately address the problems of corrosion and reparability. Consequently, there is a need for such degassing valves.

SUMMARY OF THE INVENTION

An automatic degassing valve is provided for entrapping and automatically venting gas from any desired type of liquid containing system by means of a valve mechanism which opens to vent air in accordance with the amount of air entrapped therein. Such an automatic vent valve has a valve unit and a float for controlling the operation thereof with improved connections between the float and the valve that are positive and accurate in operation and result in a compact device consuming minimum space. The automatic vent valve is simple and economical in construction and has working parts that are readily removable for purpose of repair or replacement and are corrosion resistant.

To facilitate the aforementioned features, the components are made of resinous material, such as but not limited to polyvinylchloride and polypropylene, with elastic elements made of, but not limited to, EPDM (ethylene/propylene/diene terpolymer) or fluoroelastomers (such as Viton® fluoroelastomers).

According to the present invention, the automatic degassing vent valve comprises a housing of corrosion resistant material defining a chamber having an inlet opening for receiving a liquid and a vent for venting gas from the liquid. A float of corrosion resistant material is within the housing, the float being movable between a first level when there is excessive gas in the chamber and a second level when liquid floating the float indicates no need to vent gas from the chamber. A normally open vent closure of corrosion resistant material seats against and seals the vent when the float is at the second level. A linkage of corrosion resistant material extends between the normally open vent closure and the float for causing the normally open vent closure to seat against and close the vent when the float is at the second level. Elastic elements for retaining the linkage adjacent to the degassing and on the float are also made of corrosion resistant material.

In a further aspect of the automatic degassing valve the corrosion resistant materials are resinous materials and/or fluoroelastomers.

In a further aspect of the automatic degassing valve, the vent is in a removable closure portion of the housing, and the linkage is a lever having a first end retained to the float by a first removable elastic element and retained to the closure by a second removable elastic element.

In still a further aspect of the automatic degassing valve, the removable closure portion of the housing is threaded for threaded engagement with a complementary threaded portion of the housing. The second removable elastic element is an elastic band which fits around the second end of the lever and is removably secured to the closure and the first removable elastic element an elastic ring which fits around the first end of the lever and retains the lever in a slotted portion of the float.

In still a further aspect of the automatic degassing vent valve, the removable closure portion is a threaded plug with the lever and float attached to the threaded plug for removal and insertion into the chamber as an assembled unit which is disassembled by releasing the elastic ring from the lever and releasing the elastic band from the arms on the closure.

BRIEF DESCRIPTION OF DRAWING

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
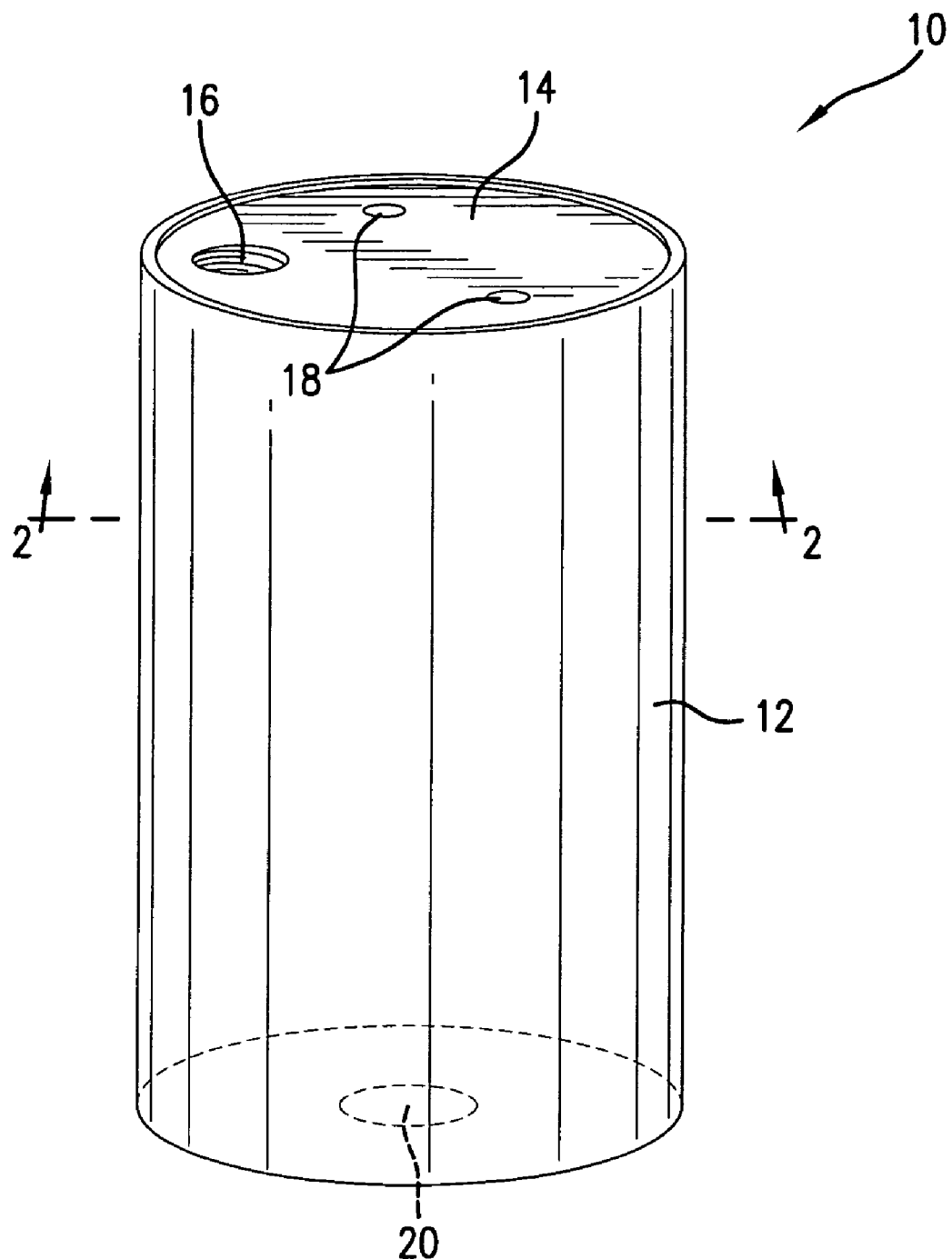
FIG. 1 is a perspective view of the automatic degassing valve.

Referring now to FIG. 1 there is shown an automatic degassing valve 10 having a housing 12 which is closed by a closure plug 14 having a vent port 16 a gas such as but not limited to air. The closure plug 14 includes a pair of recesses 18 to facilitate removal of the closure plug from the housing 12. Shown in dotted lines is an inlet port 20 which is coaxial with the cylindrical housing 12. The automatic degassing valve 10 vents gases, such as but not limited to air, that is in liquids transported in fluid lines in a system with which the inlet port 20 communicates.

Figure 2:
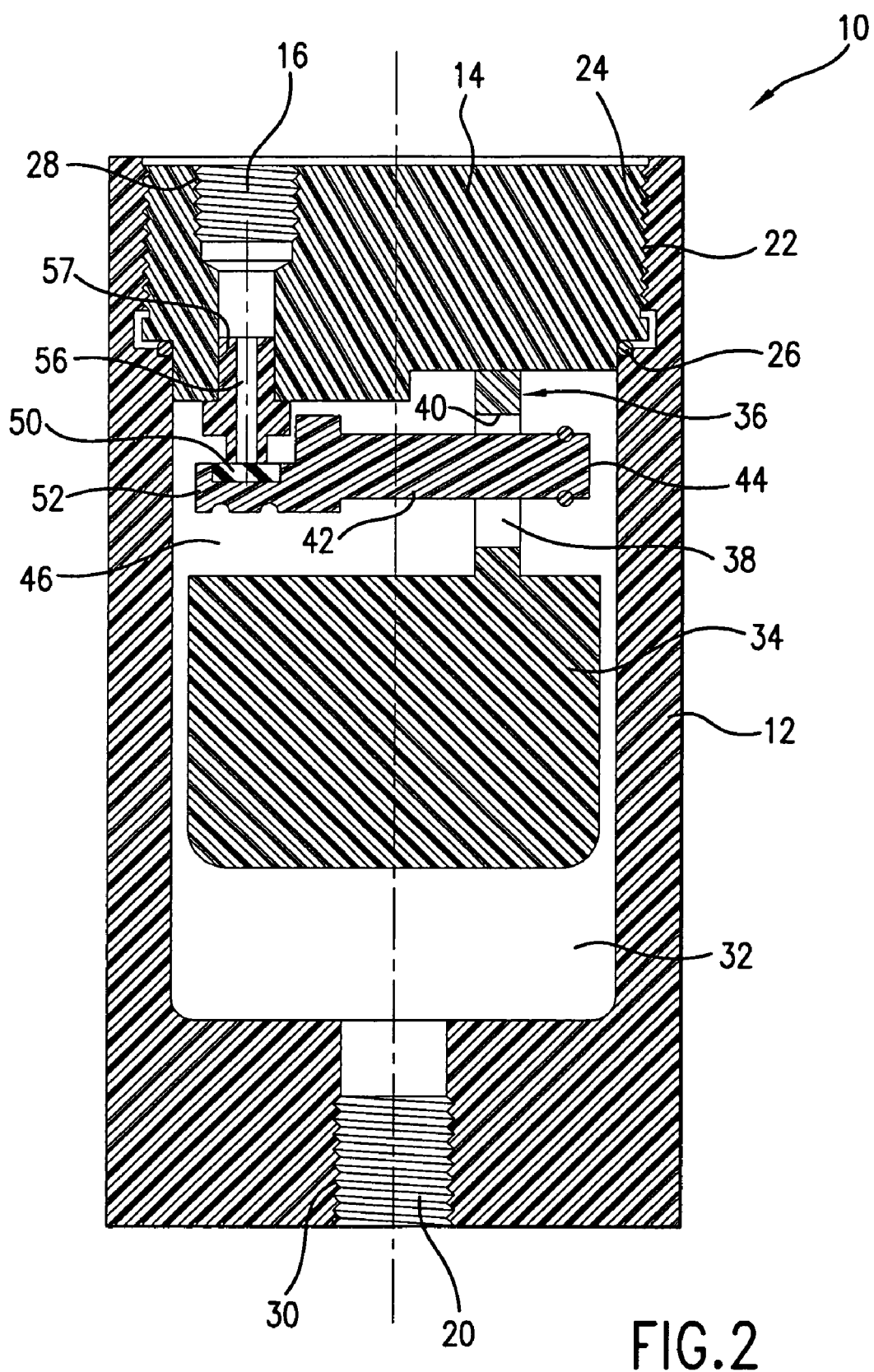
FIG. 2 is an elevation along lines 2-2 of FIG. 1.

Referring now to FIG. 2, where an elevation through the assembled device of FIG. 1 is shown, it is seen that the closure 14 has an external thread 22 that mates with an internal thread 24 of the housing 12 and seats against an O-ring seal 26. The vent 16 is a bore through the closure 14 having internal threads 28 for receiving a threaded end of a vent tube (not shown). The inlet port 20 has internal threads 30 also for receiving the threaded end of a connection to a device having a liquid therein. The housing 12 has a chamber 32 which receives liquid through the inlet opening in the form of an inlet port 20, which chamber 32 has a float 34 therein which is pushed upwardly by liquid in the chamber 32. The float has a coupling 36, which is a projection preferably unitary therewith that has a slot 38 therein. The slot 38 has a top wall 40 which engages an actuating lever 42 to pull a first end 44 of the actuating lever 42 downwardly when the float 34 moves downwardly. As will be explained hereinafter, downward movement of the float 34 occurs when a gas such as air accumulates in the top portion 46 of the chamber 32, thereby moving the first end 44 of the actuating lever 42 downward and allowing accumulated air to vent through the vent portion 16.

Since the elongated slot 38 has a length greater than the diameter of the actuating lever 42, a lost motion connection is established between the lever 42 and the slot 38. Consequently, there is an opportunity for gas to accumulate in the upper portion 46 of the chamber 32 before the actuating lever 42 is moved. In a preferred embodiment, the actuating lever has an elastic seat 50 at a second end 52 thereof which closes an orifice in an orifice plug 57 having an internal bore 56. The elastic seat 50 is normally held by an O-ring seal against the orifice or mouth of the bore 56, keeping the bore 56 closed and pivots on the edge of the orifice plug 57 to open.

Upon the float 34 dropping in the housing 12 due to gas accumulating in a portion 46 of the chamber 32, the elastic seat 50, preferably made of rubber, moves away from the mouth of the bore 56 and gas and is able to flow from top chamber portion 46 through the bore 56 and out through the vent port 16. As the gas is vented, hydraulic pressure acts against the float 34 moving it upwards until the end of the coupling 36 abuts the bottom surface of the cylindrical plug 14. This allows the elastic seat 50 at end 52 of actuating lever 42 to seat against the mouth of the bore 56 in the orifice plug 57.

Figure 3:
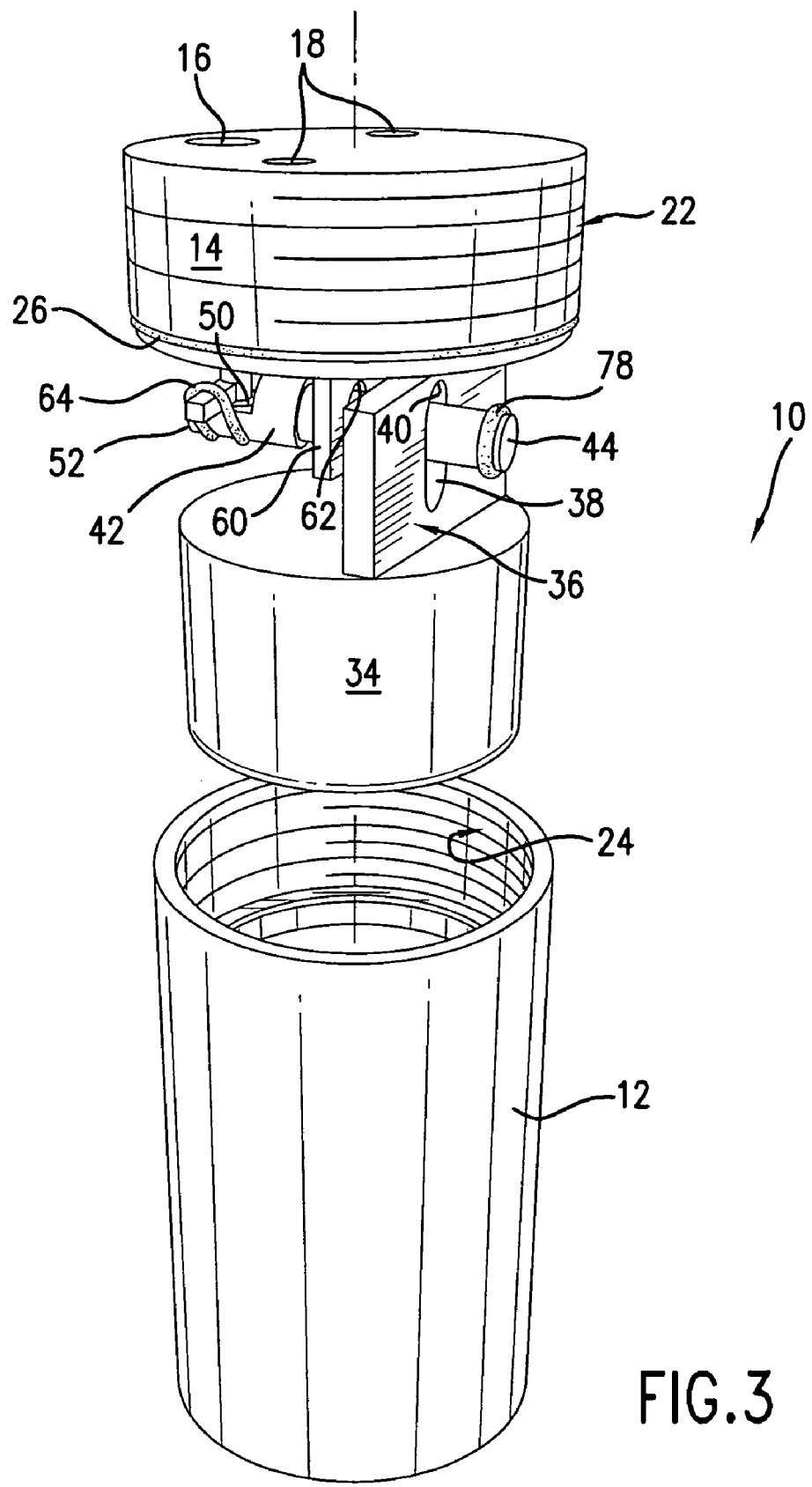
FIG. 3 is an exploded perspective view showing a closure with a float attached in axial alignment with a housing of the valve.
Figure 4:
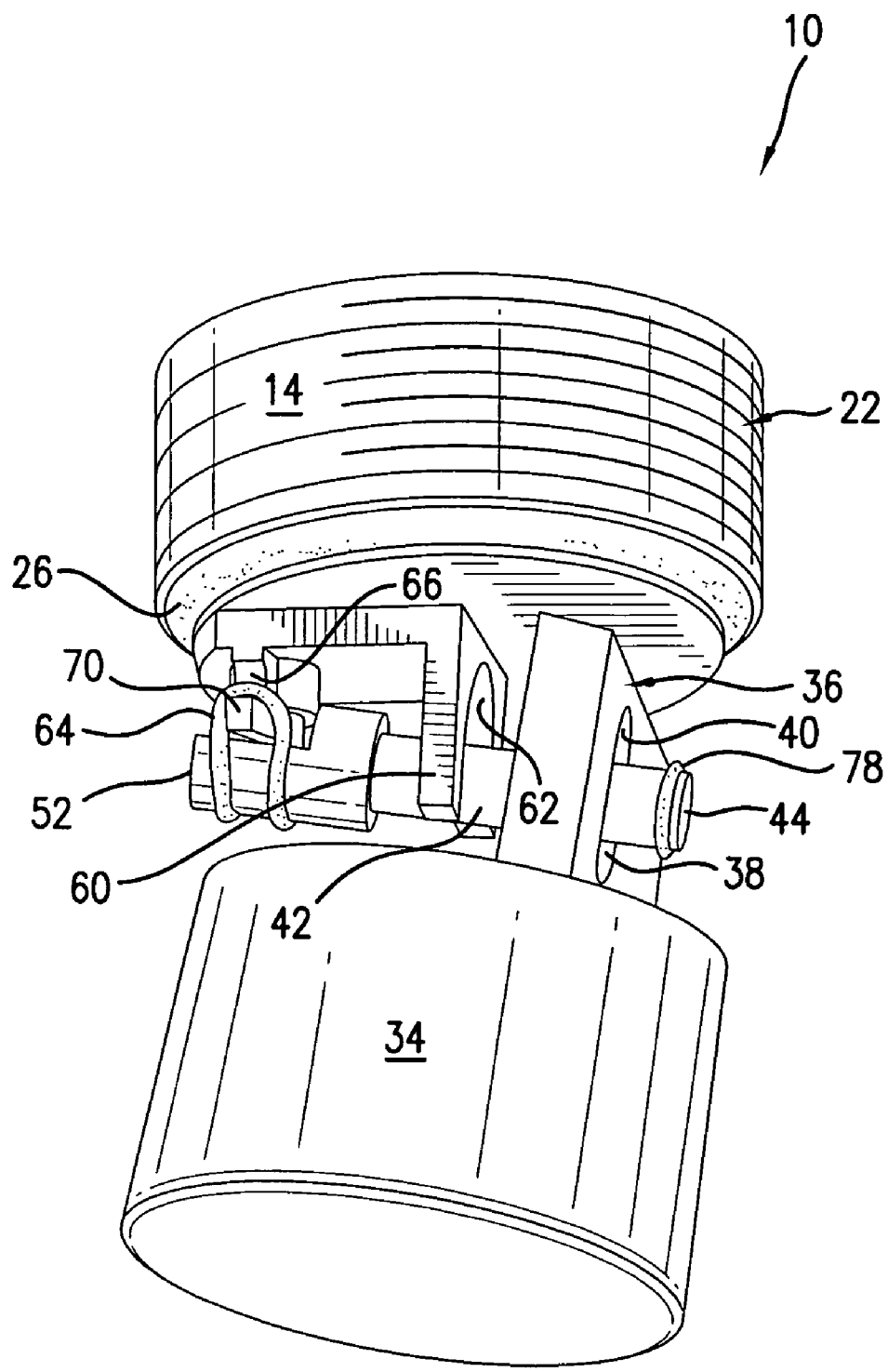
FIGS. 4 and 5 are perspective views of the closure and float assembled.
Figure 5:
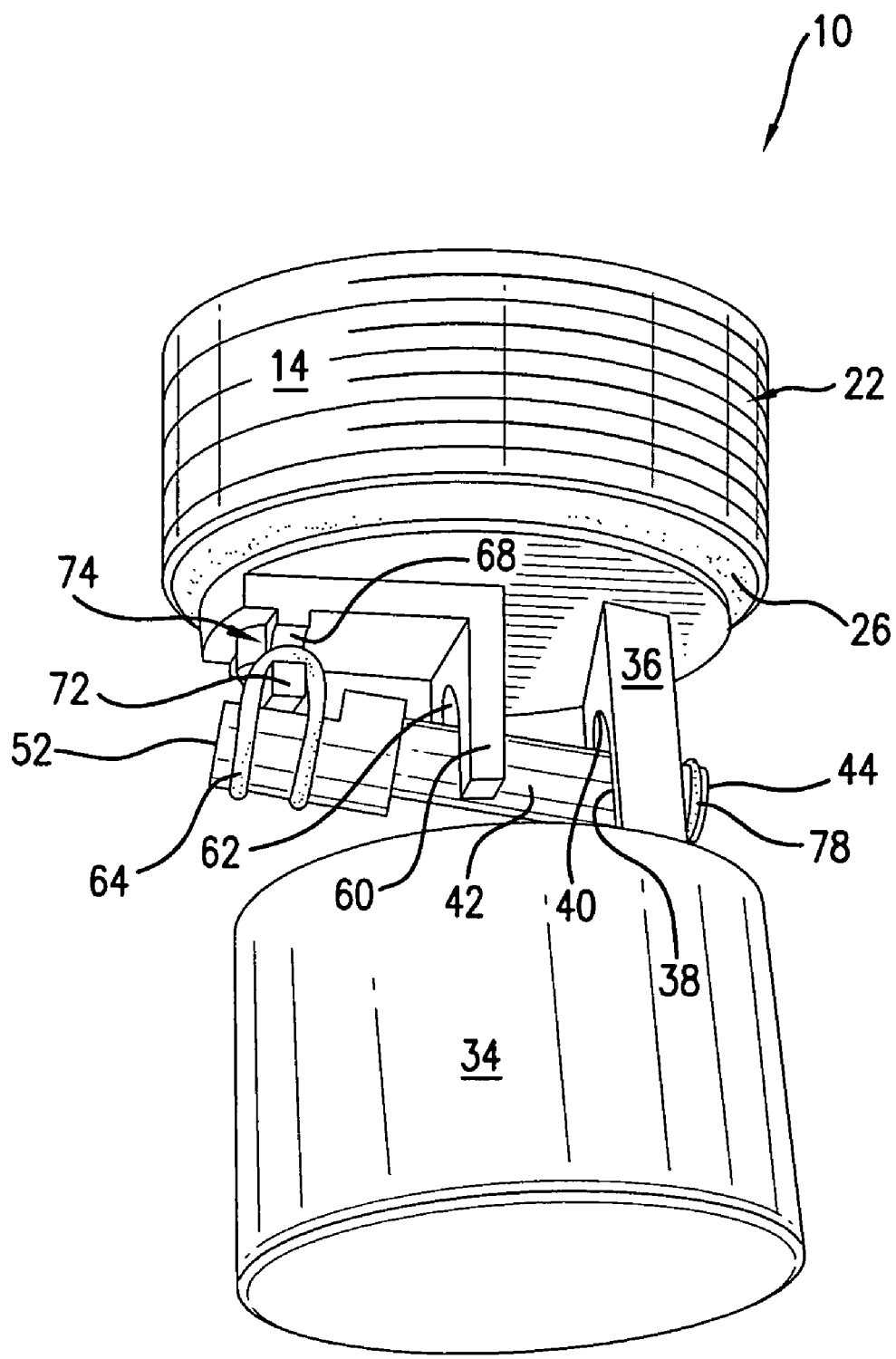

Referring now to FIG. 3, it is seen that the closure 14 assembles and disassembles from the housing 12 by rotating closure 14 to engage or disengage the external threads 22 on the closure with the internal threads 24 on the housing. It is also seen from FIGS. 3 and 4 that the actuating lever 42 can be stabilized by a slot 62 in a U-shaped projection 60 that receives the actuating lever 42 so as to function as a stabalizing support. As is seen in FIGS. 3-6, a preferable arrangement for holding the second end 52 of the actuating lever to seat the flat elastic seat 50 against the open end of the bore 56 in the orifice plug 57 is to utilize an O-ring type elastic element 64. The O-ring type elastic element 64 has its opposite ends received in grooves 66 and 68 disposed in arms 70 (FIG. 4) and 72 (FIG. 5) defining a bracket 74 that straddles the elastic seat 50.

Figure 6:
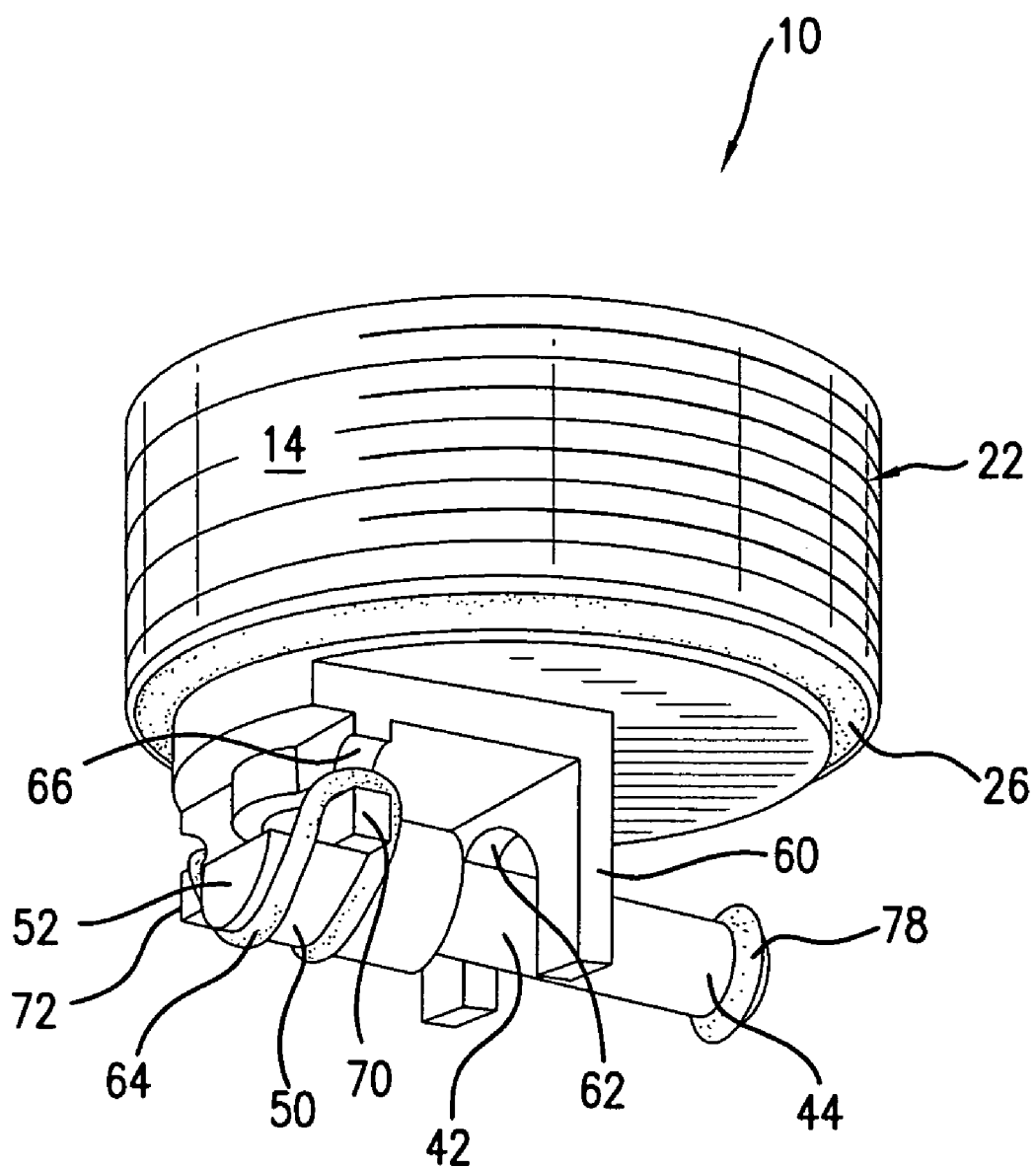
FIG. 6 is a perspective view of the closure and a closure support without the float.

Referring now to FIG. 6, the plug 14 and actuating lever 42 are a sub-assembly with the float 34 being held onto the actuating lever by an O-ring 78 in a groove at the first end 44 of the actuating lever 42. To attach float 34 to the actuating lever 42, the shank of the actuating lever is inserted through slot 38 of the coupling 36. O-ring 78 is then mounted in the groove at the first end 44 of the actuating lever 42 to hold the float on the actuating lever. If it is desired to replace an element such as the float 34, for example, with a float of a different buoyancy, the float 34 may be changed by rolling off the O-ring 78 and sliding the shank of the lever 42 out of the elongated slot 38 so that the sub-assembly of the closure plug 14 and the actuator arm 42 which is shown in FIG. 6 can receive a different float 34.

In the preferred embodiment of this invention, the float 34 and unitary coupling 36 are preferably made of polypropylene as is the actuator arm 42. The closure plug 14 and the U-shaped projection 60 that is preferably unitary therewith are made of a resinous material such as polyvinylchloride (PVC). The housing 12 is also preferably made of PVC. The elastic band 64 and O-ring 78 are preferably made of EPDM or a fluoroelastomer, such as a vinylidene fluoride/hexafluoropropylene copolymer.

Figure 7:
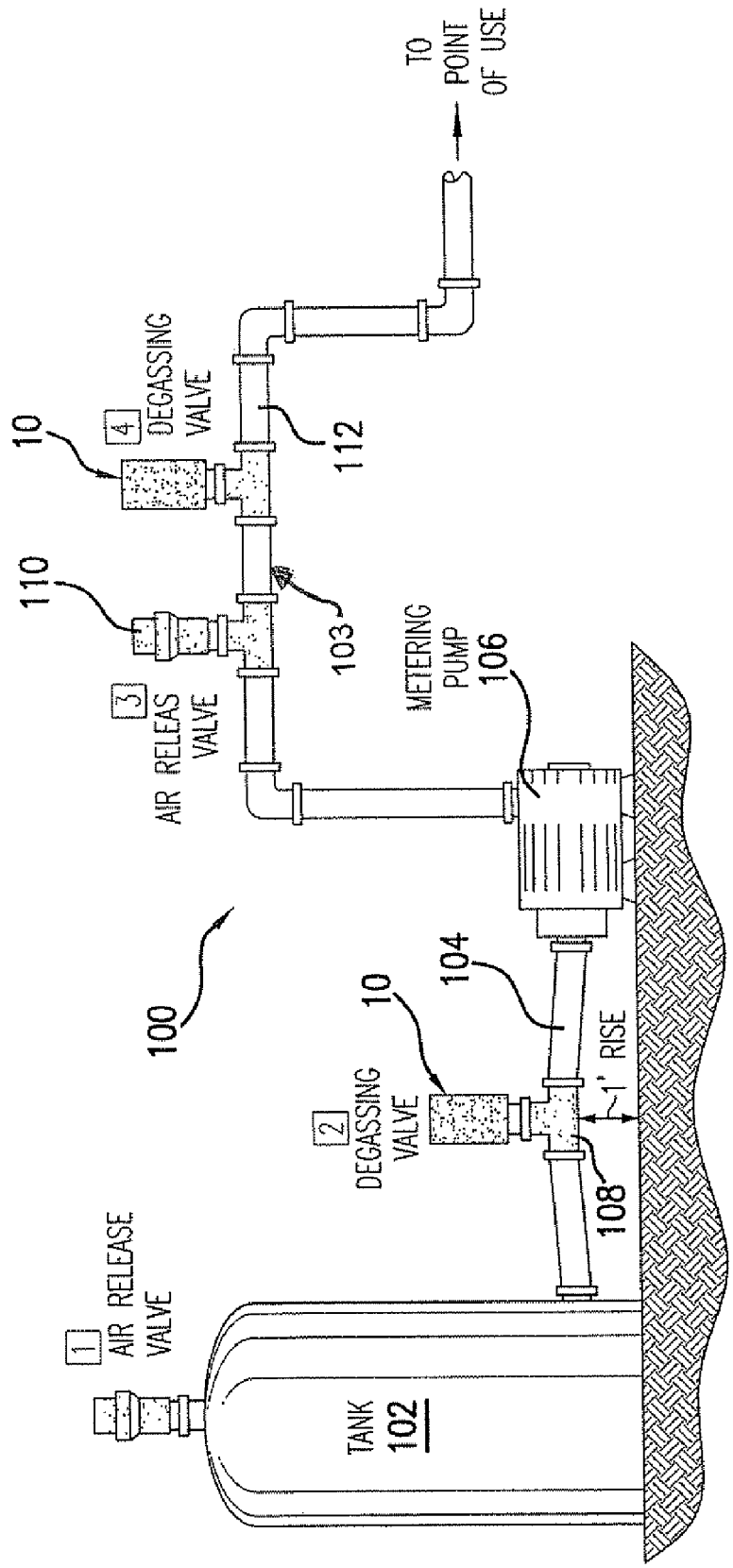
FIG. 7 is a schematic view of a system employing the automatic degassing valve of FIGS. 1-6.

FIG. 7 shows the degassing valve 10 of FIGS. 1-6 employed in a system 100 wherein liquid is pumped from a tank 102 through a fluid line 103 including a pipe 104 by a pump 106. The pipe 104 has a rise 108 so that the degassing valve 10 vents gas at a high point in the pipe. Downstream of the pump 106 an air release valve 110 and a second degassing valve 10, both located in a high level in piping 112, vent air and gas from the liquid. The degassing valves 10 serve in this example to vent trace amounts of gas during operation of the system 100 as the gas occurs. In the system 100 of FIG. 7, the degassing valve 10 in the pipe 104 is useful when sodium hypochlorate is being transported to supplement any degassing mechanism built into the pump 106.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

What is claimed is:

1. An automatic degassing valve comprising:
   a housing of resinous corrosion resistant material, the housing having a single wall and defining a chamber having an inlet opening at the lower end of the housing for receiving a liquid and the housing having a degassing vent disposed adjacent the upper end of the housing for venting gas from the liquid;
   a float of resinous corrosion resistant material within the housing, the float being free of spring bias and being movable by liquid pressure alone between a first level when there is excessive gas in the chamber and a second level when liquid floating the float indicates no gas need be vented from the chamber;
   a normally open vent closure of resinous corrosion resistant material for seating against and sealing the vent;
   a linkage of resinous corrosion resistant material extending between the normally open vent closure and the float for causing the normally open vent closure to seat against the vent when the float is at the second level, and
   first and second elastic bands for retaining the linkage adjacent to the degassing vent and retaining the linkage on the float, the elastic bands being made of resinous corrosion resistant material.

2. The automatic degassing valve of claim 1 wherein the corrosion resistant material includes resinous materials and fluoroelastomers.

3. The automatic degassing valve of claim 2 wherein the corrosion resistant material of the housing and the float is polyvinylchloride, the corrosion resistant material of the linkage is polypropylene, and the corrosion resistant material of the elastic elements is ethylene/propylene, diene terpolymer or a fluoelastomer.

4. The automatic degassing valve of claim 1 wherein the degassing vent is in a removable closure portion of the housing, and wherein the linkage is a lever having a first end retained to the float by the first elastic band and retained to the closure by the second removable elastic band.

5. The automatic degassing valve of claim 4 wherein the removable closure portion of the housing is threaded for threaded engagement with a complementary threaded portion of the housing; wherein the second removable elastic band is an elastic loop that fits around the second end of the lever and is removably secured to the closure, and wherein the first removable elastic band is an elastic loop that fits around the first end of the lever and retains the lever in a slotted portion of the float.

6. The automatic degassing valve of claim 5 wherein the removable closure portion has a pair of arms around which the second elastic loop fits and wherein the slotted portion of the float is with a slot therein whichrecieves the first end of the lever therethrough, the elastic ring preventing the first end of the lever from disengaging from the slot.

7. The automatic degassing valve of claim 6 wherein a U-shaped projection extends from the closure into the chamber and straddles the lever intermediate ends of the lever.

8. The automatic degassing valve of claim 7 wherein the removable closure portion is a threaded plug and wherein the lever and float are attached to the threaded plug for removal and insertion into the chamber as an assembled unit which is disassembled by releasing the elastic loop from the lever and releasing the elastic loop from the arms on the closure.

9. The automatic degassing valve of claim 8 wherein the corrosion resistant material of the housing and the float is polyvinylchloride, the corrosion resistant material of the linkage is polypropylene, and the corrosion resistant material of the elastic elements is ethylene/propylene, diene terpolymer or a fluoelastomer.

10. The automatic degassing valve of claim 4 wherein the removable closure portion is a threaded plug having a band retaing arm thereon and wherein the lever and float are attached to the threaded plug for removal and insertion into the chamber as an assembled unit which is disassembled by releasing the first elastic band from the lever and releasing the second elastic band from retaining arms on the closure.

11. The automatic degassing valve of claim 1 wherein the degassing valve is in combination with a fluid line transporting a corrosive liquid and vents trace amounts of gas from the fluid line.

* * * * *

UNITED STATES PATENT AND TRADEMARK OFFICE
CERTIFICATE OF CORRECTION

PATENT NO. : 7,481,238 B2
APPLICATION NO. : 11/501234
DATED : January 27, 2009
INVENTOR(S) : Roger Ramoth It is certified that error appears in the above-identified patent and that said Letters Patent is hereby corrected as shown below:

Column 4, line 64, reads "fluoelastomer." should read -- fluoroelastomer. --
Column 5, line 15, reads "float is with a slot" should read -- float is a projection with a slot --
Column 5, line 15, reads "whichreceives" should read -- which receives --
Column 5, line 16, reads "the elastic ring" should read -- the first elastic loop --
Column 6, line 10, reads "fluoelastomer." should read -- fluoroelastomer. --
Column 6, line 13, reads "retaing arm" should read -- retaining arm --

Signed and Sealed this

Fourteenth Day of September, 2010

David J. Kappos
*Director of the United States Patent and Trademark Office*